US010109901B2

United States Patent
Rhodes et al.

(10) Patent No.: US 10,109,901 B2
(45) Date of Patent: Oct. 23, 2018

(54) BATTERY THERMAL INTERFACE MATERIAL INSTALLATION ASSEMBLY AND METHOD

(71) Applicant: Ford Global Technologies, LLC, Dearborn, MI (US)

(72) Inventors: Kevin James Rhodes, Dearborn, MI (US); Patrick Daniel Maguire, Ann Arbor, MI (US); Juil Yum, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 15/216,972

(22) Filed: Jul. 22, 2016

(65) Prior Publication Data

US 2018/0026321 A1    Jan. 25, 2018

(51) Int. Cl.
| | |
|---|---|
| *H01M 10/6551* | (2014.01) |
| *H01M 10/613* | (2014.01) |
| *H01M 10/6556* | (2014.01) |
| *H01M 10/625* | (2014.01) |
| *H01M 10/653* | (2014.01) |
| *H01M 2/10* | (2006.01) |

(52) U.S. Cl.
CPC ..... *H01M 10/6556* (2015.04); *H01M 2/1077* (2013.01); *H01M 10/613* (2015.04); *H01M 10/625* (2015.04); *H01M 10/653* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,541,127 B2 | 9/2013 | Tennessen et al. | |
| 2013/0288098 A1* | 10/2013 | Hamlett | H01M 10/5083 429/120 |
| 2015/0146378 A1 | 5/2015 | You et al. | |
| 2016/0020496 A1* | 1/2016 | Burrows | H01M 10/482 429/62 |
| 2016/0064783 A1 | 3/2016 | Chorian et al. | |
| 2016/0111396 A1 | 4/2016 | Kim | |

OTHER PUBLICATIONS

Prasher, Ravi, Thermal Interface Materials: Historical Perspective, Status, and Future Directions, Aug. 2006, pp. 1571-1586 vol. 94, No. 8, Proceedings of the IEEE.

\* cited by examiner

*Primary Examiner* — Tracy M Dove
(74) *Attorney, Agent, or Firm* — Carlson, Gaskey & Olds, P.C.

(57) ABSTRACT

An exemplary thermal interface material installation method includes, among other things, moving a material through a conduit to a cavity within a battery array. The conduit is at least partially provided by a thermal exchange plate of the battery array. The method further includes holding the material within the cavity to provide a thermal interface material between the thermal exchange plate and at least one battery cell assembly. An exemplary battery thermal interface material installation assembly includes a thermal exchange plate including a conduit with at least one inlet that opens to an exterior of a battery array, and at least one outlet that opens to a cavity between the thermal exchange plate and a plurality of battery cell assemblies.

11 Claims, 3 Drawing Sheets

BATTERY THERMAL INTERFACE MATERIAL INSTALLATION ASSEMBLY AND METHOD

TECHNICAL FIELD

This disclosure relates generally to installing a thermal interface material within a battery array. More particularly, the disclosure relates to installing the thermal interface material utilizing a conduit within a thermal exchange plate of the battery array.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Thermal energy in the battery cell assemblies can increase during some stages of operation, such as when the battery cell assemblies are charged and discharged. Accordingly, some battery packs circulate a coolant through a thermal exchange plate. The coolant carries the thermal energy away from the battery pack to reduce thermal energy levels in the battery cell assemblies and other portions of the battery pack. The battery pack can incorporate a thermal interface material to ensure good thermal contact between the thermal exchange plate and other areas of the battery pack. The thermal interface material can be incorporated into other areas of the battery pack as well.

SUMMARY

A thermal interface material installation method according to an exemplary aspect of the present disclosure includes, among other things, moving a material through a conduit to a cavity within a battery array. The conduit is at least partially provided by a thermal exchange plate of the battery array. The method further includes holding the material within the cavity to provide a thermal interface material between the thermal exchange plate and at least one battery cell assembly.

A further non-limiting embodiment of the foregoing method includes moving the material from the conduit to the cavity through a plurality of conduit outlets.

A further non-limiting embodiment of any of the foregoing methods includes moving the material to the conduit through a conduit inlet. The conduit outlets that are further from the conduit inlet have a diameter that is greater than conduit outlets closer to the conduit inlet.

A further non-limiting embodiment of any of the foregoing methods includes blocking the conduit inlet after the moving to prevent the material from moving from the conduit through the at least one conduit inlet.

A further non-limiting embodiment of any of the foregoing methods includes moving the material to the conduit through at least one conduit inlet in a first direction, and moving the material from the conduit through at least one conduit outlet in a second direction. The conduit redirects a flow of the material such that the first direction is transverse to the second direction.

A further non-limiting embodiment of any of the foregoing methods includes guiding a flow of the material within the cavity using a structural feature extending from the battery cell assembly.

A further non-limiting embodiment of any of the foregoing methods includes injecting the material into the conduit as a liquid during the moving, and subsequently curing the material.

A further non-limiting embodiment of any of the foregoing methods includes a plurality of coolant channels in the heat exchanger plate that are separate and distinct from the conduit.

A further non-limiting embodiment of any of the foregoing methods includes moving some of the material from the conduit to the cavity through a first conduit outlet having a first diameter and located near a first axial end of the thermal exchange plate, and moving some of the material from the conduit to the cavity through a second conduit outlet having a greater, second diameter and located near an opposing, second axial end of the thermal exchange plate.

A battery thermal interface material installation assembly according to another exemplary aspect of the present disclosure includes, among other things, a thermal exchange plate including a conduit with at least one conduit inlet that opens to an exterior of a battery array, and at least one conduit outlet that opens to a cavity between the thermal exchange plate and a plurality of battery cell assemblies.

In a further non-limiting embodiment of the foregoing assembly, the assembly includes a thermal interface material within the cavity.

In a further non-limiting embodiment of any of the foregoing assemblies, the assembly includes the thermal interface material interface material within the conduit.

In a further non-limiting embodiment of any of the foregoing assemblies, the assembly includes a cap secured to the conduit inlet to block a thermal interface material from flowing through the inlet.

In a further non-limiting embodiment of any of the foregoing assemblies, the conduit inlet is provided in a first surface of the thermal exchange plate, and the conduit outlet is provide in a second surface of the thermal exchange plate that is transverse to the first surface.

In a further non-limiting embodiment of any of the foregoing assemblies, the conduit inlet is provided in a first surface of the thermal exchange plate, and the conduit outlet is provide in a second surface of the thermal exchange plate that is generally perpendicular to the first surface.

In a further non-limiting embodiment of any of the foregoing assemblies, the conduit extends linearly from the at least one inlet to the at least one outlet.

In a further non-limiting embodiment of any of the foregoing assemblies, the thermal exchange plate further includes a plurality of coolant channels that separate and distinct from the conduit.

In a further non-limiting embodiment of any of the foregoing assemblies, the assembly includes a thermal interface material within the cavity, and the plurality of battery cell assemblies distributed along an axis. The thermal interface material is configured to transfer thermal energy from the plurality of battery cell assemblies to the thermal exchange plate.

In a further non-limiting embodiment of any of the foregoing assemblies, the plurality of battery cell assemblies are a first plurality of battery cell assemblies, and the assembly includes a second plurality of battery cell assemblies spaced from the first plurality of battery cell assemblies. The thermal interface material is configured to transfer thermal energy from both the first and second plurality of battery cell assemblies to the thermal exchange plate.

In a further non-limiting embodiment of any of the foregoing assemblies, the plurality of battery cell assemblies are compressed axially between a pair of end plates.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to installing a thermal interface material (TIM) within a battery pack. During installation, the TIM is moved through a conduit that is at least partially provided by a thermal exchange plate to a cavity within the battery pack. The TIM then can cure if required. The TIM can cure within the cavity in some examples. Installing the TIM by moving the TIM through the conduit in the battery pack can reduce leakage of the TIM.

Figure 1:
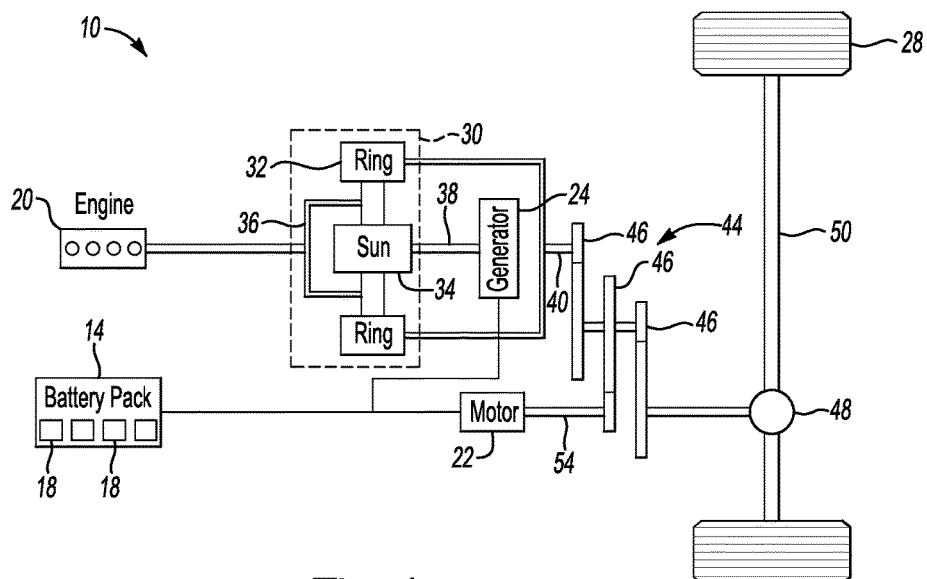
FIG. 1 illustrates a schematic view of an example powertrain of an electrified vehicle.

Referring to FIG. 1, a powertrain 10 of a hybrid electric vehicle (HEV) includes a battery pack 14 having a plurality of battery arrays 18', 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
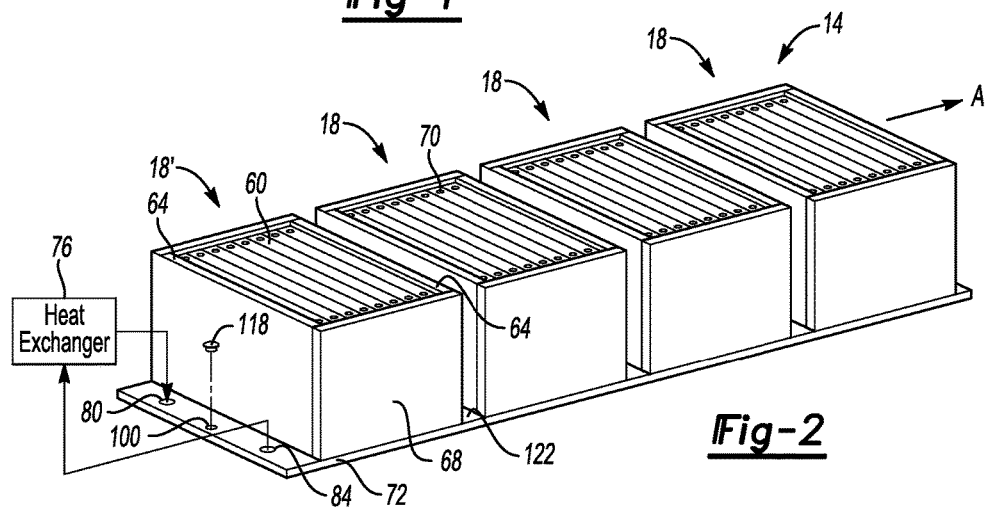
FIG. 2 illustrates a perspective view of a battery pack from the powertrain of FIG. 1 including a plurality of individual battery arrays.

Referring now to FIG. 2 with continuing reference to FIG. 1, the example battery pack 14 includes four of the battery arrays 18', 18 disposed along an axis A. Each of the battery arrays 18', 18 includes a plurality of battery cell assemblies 60, a pair of end plates 64, and side walls 68. The battery arrays 18', 18 are positioned upon a thermal exchange plate 72, which is used to control thermal energy levels within the battery cell assemblies 60 and other areas of the battery pack 14.

Within each of the battery arrays 18', 18, the battery cell assemblies 60 are compressed axially between the pairs of end plates 64. The side walls 68 are at opposing lateral outer edges of the battery cell assemblies 60. Terminals 70 of the battery cell assemblies 60 can electrically connect the battery arrays 18', 18 to other portions of the powertrain 10.

The battery cells assemblies 60 include prismatic battery cells in this example. In another examples, the battery cell assemblies instead, or additionally, include pouch-style battery cells.

From time to time, thermal energy of the battery cell assemblies 60 and other portions of the battery pack 14 can increase. Reducing the thermal energy can be required to efficiently operate the battery pack 14 and avoid complications associated with high levels of thermal energy.

Figure 3:
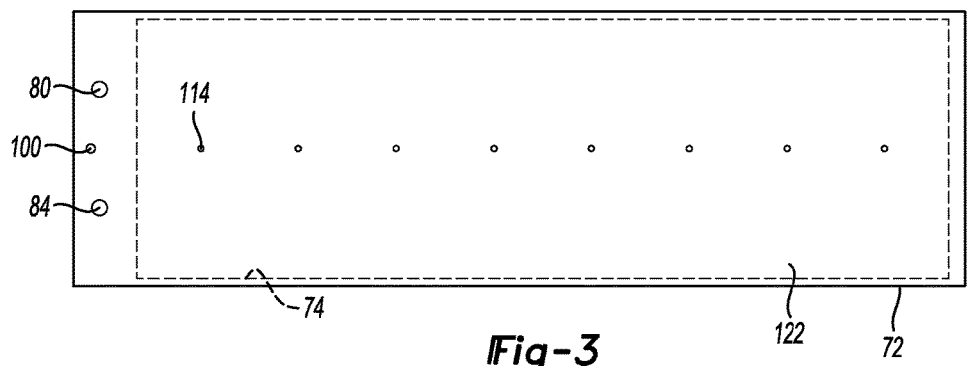
FIG. 3 illustrates a top view of a thermal exchange plate from the battery pack of FIG. 2.
Figure 4:
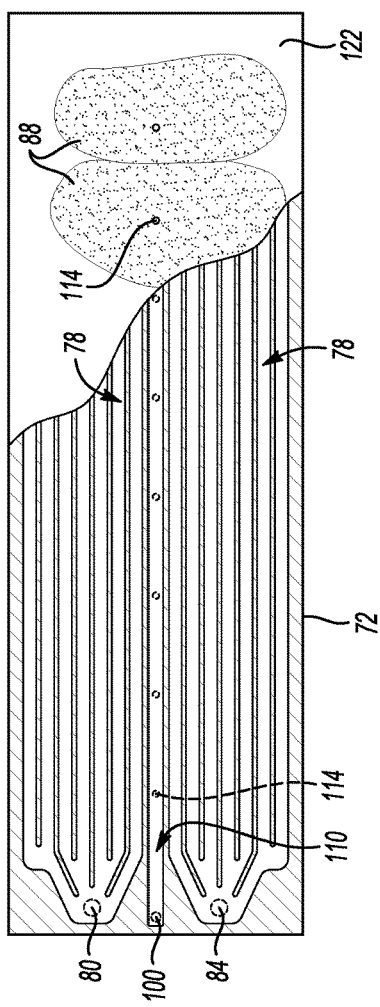
FIG. 4 illustrates the thermal exchange plate of FIG. 3 with selected portions cut away to show a plurality of cooling channels and a thermal interface material conduit.

Referring now to FIGS. 3 and 4 with continuing reference to FIG. 2, the thermal exchange plate 72 can be used to remove thermal energy from the battery cell assemblies 60. The arrays 18', 18 are positioned on the thermal exchange plate 72 within a thermal exchange region 74.

In one non-limiting embodiment, the thermal exchange plate 72 is a stamped aluminum structure.

To reduce thermal energy within the battery pack 14, a coolant, such as a liquid coolant, is moved from a heat exchanger 76 through a coolant inlet 80 within the thermal exchange plate 72. The coolant then circulates near the thermal exchange region 74 through coolant channels 78 within the thermal exchange plate 72. Within the coolant channels 78, the coolant takes on thermal energy from the battery cell assemblies 60 and other portions of the battery pack 14.

The heated coolant than moves from the coolant channels 78 through a coolant outlet 84 of the thermal exchange plate 72 back to the heat exchanger 76. At the heat exchanger 76, the thermal energy within the heated coolant is transferred from the coolant. The heat exchanger 76 could, for example, exchange the thermal energy in the heated coolant to ambient air.

Figure 5:
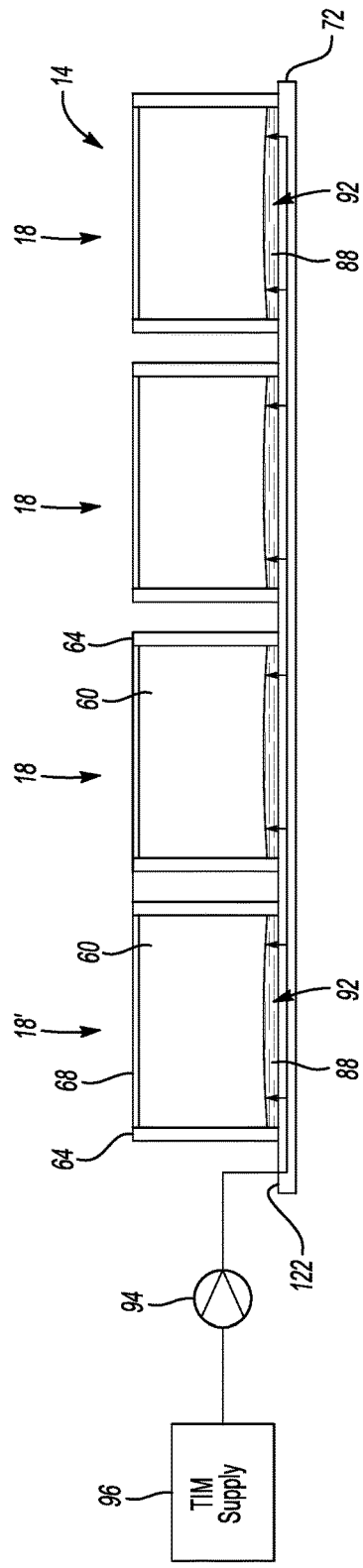
FIG. 5 illustrates a schematic side view of the battery pack of FIG. 2 with selected side walls removed.
Figure 6:
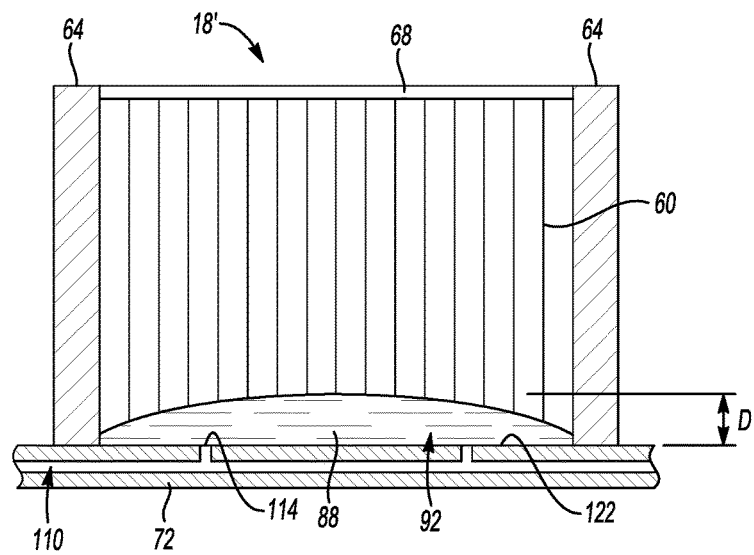
FIG. 6 illustrates a schematic, partially sectioned, side view of a battery array from the battery pack of FIG. 5.

Referring now to FIGS. 5-6 with continuing reference to FIGS. 2-4, a TIM 88, substantially fills a cavity 92 between surfaces of the battery cell assemblies 60 and the thermal exchange plate 72. The TIM 88 facilitates thermal conductivity between the battery array 18' and the thermal exchange plate 72 within thermal exchange region 74. The remaining battery arrays 18 of the battery pack 14 are similarly configured to include respective cavities between surfaces of the battery cell assemblies 60 and the thermal exchange plate 72.

The TIM 88 is sandwiched between the battery cell assemblies 60 and the thermal exchange plate 72. A first side of the TIM 88 faces the thermal exchange plate 72. An opposing, second side of the TIM 88 faces the battery cell assemblies 60. The TIM 88 is used to transfer thermal energy from the battery cell assemblies 60 to the thermal exchange plate 72.

Generally, the TIM 88 could be any material that facilitates thermal conductivity. In one non-limiting embodiment, the TIM 88 is a silicon based material. In another non-limiting embodiment, the TIM 88 is a two-part epoxy material.

In this example, the TIM 88 is liquid during installation. Once installed within the cavity 92, the TIM 88 could remain a liquid, or could cure within the cavity 92 to provide a non-liquid TIM 88. In another example, the TIM 88 cures when partially installed within the cavity, or when outside the cavity.

To install the TIM 88 into the cavity 92, a pump 94 pumps the TIM 88 from a TIM supply 96 through a conduit inlet 100 in the thermal exchange plate 72. The TIM 88 is moved through the conduit inlet 100 under pressure, which forces the TIM 88 to move from the conduit inlet 100 through a conduit 110 in the thermal exchange plate 72. In another example, a syringe is used to force the TIM 88 into conduit 110. In this example, the entire conduit 110 is provided by the thermal exchange plate 72. In another example, the thermal exchange plate 72 provides a portion of the conduit 110, and another portion of the battery pack 14, such as the end plates 64 or the side walls 68, provide the remaining portions.

Notably, the conduit 110 is at least partially provided within the thermal exchange plate 72, and is separate and distinct from coolant channels 78 within the thermal exchange plate 72. The coolant channels 78 communicate coolant from the heat exchanger 76 through the thermal exchange plate 72 to cool the battery array 18' and other portions of the battery pack 14 during operation.

Some of the TIM 88 moves from the conduit 110 through at least one conduit outlet 114 into the cavity 92. After entering the cavity 92, the TIM 88 spreads out to fill the cavity 92. Some of the TIM 88 also moves from the conduit 110 through other conduit outlets 114 into cavities associated with the other battery arrays 18 disposed atop the thermal exchange plate 72.

In some examples, a structural feature of the battery pack 14 can be used to guide flow of TIM 88 within the cavity 92. For example, the battery cell assemblies 60 could include thermal fins (not shown) that directly contact the TIM 88. The thermal fins facilitate thermal energy transfer from the battery cell assemblies 60 to the TIM 88. The thermal fins can additionally guide flow within the cavity 92 to particular areas of the cavity 92 that may be more difficult to fill with TIM 88. For example, the thermal fins could be angled to direct a flow of the TIM 88 to areas of the cavity 92 that are furthest from the conduit outlet 114.

The thermal exchange plate 72 could also include structural features, such as ridges or baffles, extending into the cavity 92 to keep the TIM 88 from flowing in some areas of the cavity 92 or to guide the TIM 88 to flow along a particular direction.

In another example, the battery cell assemblies 60 could block or otherwise discourage flow of the TIM 88 from the cavity 92 in areas closer to the conduit outlet 114, and be open to encourage flow of the TIM 88 from the cavity 92 in areas that are further from the conduit outlet 144.

One example area that is further from the conduit outlet 114 could be the outer corners areas of the cavity 92, such as the area near the leader line associated with reference number 122 in FIG. 4. In such an example, the TIM 88 flows through the conduit outlet 114 into the cavity 92, and is then controlled to exit the cavity 92 near the corners of the cavity 92, which can be more difficult to fill. The cavity 92 is considered to be adequately filled with TIM 88 when some of the TIM 88 has exited the cavity 92 at the corners.

The TIM supply 96 continues to pump TIM 88 in liquid form through the conduit inlet 100 until the cavity 92 associated with the battery array 18' is filled with the TIM 88, and until the cavities associated with the other arrays 18 are filled with the TIM 88. A cap 118 is then secured over the conduit inlet 100 to prevent the liquid TIM 88 from flowing out of the conduit 110 through the conduit inlet 100.

As the TIM 88 moves into the cavity 94, the flow of TIM 88 from one of the conduit outlets 114 can contact the flow of TIM 88 from another one of the conduit outlets 114 (FIG. 4). As the flows of TIM 88 from different conduit outlets 114 begin to overlap, the TIM 88 is directed laterally outward in a direction perpendicular to the axis A. This can promote fully filling the cavity 92.

In some examples, air, nitrogen, or some other fluid, could be forced through the conduit inlet 100 into the conduit 110 prior to securing the cap 118 over the conduit inlet 100. The air or other fluid could force TIM 88 remaining in the conduit 110 into the cavities 92. The conduit 110 is then filled with a fluid that is different than the TIM 88. Accordingly, a total amount of TIM 88 is reduced. That is, rather than the cavities 92 and the conduit 110 being filled with TIM 88, only the cavities 92 are filled. Since the TIM 88 can be costly and add weight, reducing the total amount of TIM 88 can reduce costs.

The conduit 110 extends axially from the conduit inlet 100 along the thermal exchange plate 72. In this example, the conduit 110 has a single conduit inlet 100 and a plurality of conduit outlets 114. Two of the conduit outlets 114 are associated the cavities 92 for each of the battery arrays 18', 18. Other numbers of the conduit inlet 100 and the conduit outlet 114 could be used.

Notably, the conduit outlets 114 each have a diameter. The placement of the outlets 114 can be adjusted to promote a particular flow rate of the TIM 88 into the cavity 92. The diameters of specific outlets 114 can also be adjusted to promote a particular flow rate of the TIM 88 into the cavity 92.

In this example, a diameter of the conduit outlets 114 that are closest to the conduit inlet 100 is smaller than a diameter of the conduit outlets 114 that are further from the conduit inlet 100. The diameters of the conduit outlets 114 could gradually increase moving axially away from the conduit inlet 100. That is, moving axially along the conduit 110 from the conduit inlet 100 each successive conduit outlet 114 has a greater diameter than the proceeding conduit outlets 114.

In another example, the conduit outlets 114 opening to the cavity 92 of the battery array 18' both have the same first diameter. The conduit outlets 114 opening to the cavity 92 associated with the second battery array 18 from the conduit inlet 100 have a same second diameter that is greater than the first diameter. The second battery array 18 from the conduit inlet 100 is directly adjacent the battery array 18'. The conduit outlets 114 opening to the cavity 92 associated with the third battery array 18 from the conduit inlet 100 then have a same third diameter that is greater than the second diameter. Further, the conduit outlets 114 opening to the cavity 92 associated with the fourth battery array 18 from the conduit inlet 100 have a same fourth diameter that is greater than the second diameter.

Increasing the diameter of the conduit outlets 114 can facilitate flow of the TIM 88 into the cavities 92. Since the battery arrays 18 positioned furthest from the conduit inlet 100 may experience pressure losses, increasing the diameter of these conduit outlets 114 can help to ensure that the cavities 92 associated with the battery arrays 18 are completely filled.

When the cavity 92 is filled with the TIM 88, the TIM 88 can solidify or congeal. After which, the likelihood of the TIM 88 moving from the cavity 92 back through the conduit outlets 114 as reduced. Seals, such as tape, could be used to hold the TIM 88 during the solidification in addition to the surrounding structures of the battery pack 14 (e.g., the end plates 64 and side walls 68).

Alternatively, the TIM 88 could remain in liquid form and be sealed with the cavity 92.

When installed, the TIM 88 directly contacts downwardly facing surfaces of the battery cell assemblies 60. Downwardly is with reference to horizon or ground. Other orientations are possible. That is, in other examples, the TIM 88 could be positioned in other areas of the battery pack 14 depending on, among other things, how the thermal exchange plate 72 is positioned relative to the battery cell assemblies 60.

In one non-limiting embodiment, a distance D between the battery arrays 18', 18 and the thermal exchange plate is from 0.25 to 0.30 millimeters. Tolerance stack ups, build variations, and other factors can cause 72 the distance D vary at different areas within one of the cavities 92. In the example of FIG. 4, compression of the battery cell assemblies 60 axially has caused the battery cell assemblies 60 near an axial center of the battery arrays 18', 18 to pull away from the thermal exchange plate 72 more than the battery cell assemblies 60 at the axial ends of the battery arrays 18', 18. The distance D is thus increased at an axial center of the battery arrays 18', 18 relative to the distance D at an axial end of the battery arrays 18', 18.

Since the example TIM 88 is installed as a liquid, the TIM 88 can conform to these differences in the distance D and other dimensional variations in the cavity 92. Forcing the TIM 88 into the cavity 92 under pressure further ensures the TIM 88 conforms to the dimensions of the cavity 92 and completely fill the cavity 92. Completely filling the cavity 92 with the TIM 88 ensures good thermal contact between the battery cell assemblies 60 and the TIM 88, as well as good thermal contact between the TIM 88 and the thermal exchange plate 72. The TIM 88 could, in some examples, be injected into the cavity 92 until reaching a threshold pressure, which can permit variations in the amount of TIM 88 used to fill a particular one of the cavities 92.

In one non-limiting embodiment, a perimeter of the cavity 92 could configured to communicate TIM 88 to one or more weep holes. The weep holes are sized to develop a back pressure commensurate with a fill pressure of the pump 94. The sizes of the weep holes could vary. For example, smaller weep holes could open to areas of the cavity 92 that are closest to the conduit outlets 114, and larger weep holes could open to areas of the cavity 92 that are further from the conduit outlets 114, such as areas near the outer corners of the cavity 92.

The smaller weep holes could permit air to escape from the cavity 92 as the cavity 92 is filled with TIM 88 to promote a more complete filling of the cavity 92. The smaller weep holes could be sized to inhibit substantial flow of TIM 88, which would encourage the TIM 88 to flow in other areas of the cavity 92. That is, the example smaller weep holes are not made so large that substantially amounts of TIM 88 flow through the smaller weep holes and the corners of the cavity 92 are inadequately filled.

In this example, the conduit inlet 100 to the conduit 110 and the conduit outlets 114 both open to an upwardly facing surface 122 of the thermal exchange plate 72. Other positionings for the conduit inlet 100 and the conduit outlets 114 are possible.

Since the example cavity 92 is generally oriented perpendicular to a gravitational force acting on the battery pack 14, the TIM 88 spreads outward from the conduit outlets 114 when entering the cavity 92. This orientation can promote filling the cavity 92 with the TIM 88 as the TIM 88 is not substantially pulled by gravity toward one of the lateral sides of the cavity 92.

Figure 7:
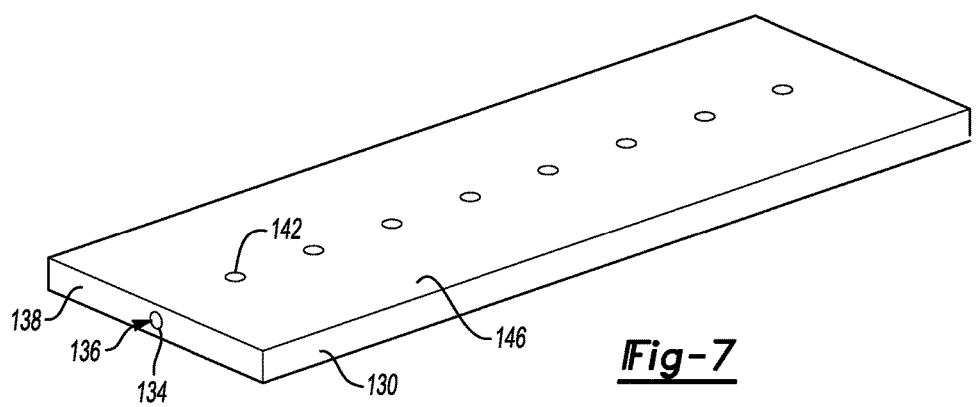
FIG. 7 illustrates a perspective view of another example thermal exchange plate for use in the battery pack of FIG. 2.

Referring now to FIG. 7, another example thermal exchange plate 130 has a conduit inlet 134 to a conduit 136 in an axially facing surface 138. A plurality of conduit outlets 142 from the conduit open to a surface 146 of the thermal exchange plate 130 that interfaces with battery arrays within a battery pack. The surface 138 is transverse to the surface 146.

Like the conduit 110 of FIG. 6, the conduit 136 is used to move a TIM in liquid form to cavities between the thermal exchange plate 130 and a plurality of battery arrays. Since the conduit inlet 134 is transverse to the conduit outlet 142, the conduit 136 redirects a flow of the TIM from a first direction to a second direction transverse to the first direction. The conduit inlet 134 can be capped to prevent the TIM from flowing back out of the cavities through the conduit 136.

Figure 8:
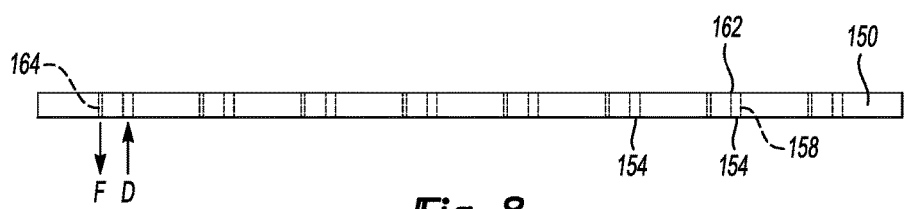
FIG. 8 illustrates a side view of yet another example thermal exchange plate for use in the battery pack of FIG. 2.

Referring now to FIG. 8, yet another example thermal exchange plate 150 includes a plurality of conduit inlets 154, conduits 158, and conduit outlets 162. A TIM is moved through the conduits 158 in a direction D to cavities between battery arrays and the thermal exchange plate 150. One the cavities are filled, the conduit outlets 162 or conduits 158 can be capped.

Each of the conduit inlets 154 is associated with one of the conduit outlets 142. Each of the conduits 158 extends linearly through the thermal exchange plate 150 from the conduit inlet 154 to the conduit outlet 162.

Each of the example conduits 158 is associated with one of the cavities in the battery pack. Structuring the thermal exchange plate 150 to have multiple conduits for communicating TIM to cavities can help to control over how much TIM is communicated to each of the cavities. Since the sizes of the cavities may vary due to build tolerances, array size, etc. different amounts of TIM could be communicated through each of the conduits 158.

In some examples, the thermal exchange plate 150 could incorporate a witness hole 164 associated with each of the cavities. The witness hole 164 extends through the thermal exchange plate 150 and opens to one of the cavities. In some examples, the witness hole 164 provides a path to view whether or not the cavity is filled with TIM. In other examples, the TIM flows out of the cavity in a direction F through the witness hole 164 when the cavity is filled with TIM. Observing TIM flowing out of the witness hole 164 thus provides an indication that the cavity is filled with TIM. The witness holes 164 can be capped after filling to prevent TIM from moving out of the cavities through the witness holes 164 once the cavities are filled. In some examples, the witness holes 164, like the previously described weep holes, are placed strategically to promote a substantially complete filling of the cavity 92, especially in the areas that are more difficult to fill, such as the outer corners of the cavity 92 furthest from the outlet conduits 114.

In addition to the thermal exchange plate 150, witness holes could be used in connection with the thermal exchange plate 72 of FIGS. 2-6, or the thermal exchange plate 130 of FIG. 7.

Features of the disclosed examples can include a TIM installation method that facilitates completely filling a cavity between battery arrays and a thermal interface plate without gapping. The disclosed examples do not require a separate conduit or installation location other than the conduit established within the thermal interface plate.

A design of the TIM conduit outlet holes, an amount of TIM, and guidance features for the TIM can promote rapid installation of the TIM into the battery pack to completely filling the cavity without gaps and without substantial amounts of TIM being squeezed out of the cavity.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery thermal interface material installation assembly, comprising:
   a thermal exchange plate including a conduit with at least one conduit inlet that opens to an exterior of a battery array, and at least one conduit outlet that opens to a cavity between the thermal exchange plate and a plurality of battery cell assemblies.

2. The assembly of claim 1, comprising a thermal interface material within the cavity.

3. The assembly of claim 2, comprising the thermal interface material within the conduit.

4. The assembly of claim 1, comprising a cap secured to the at least one conduit inlet to block a thermal interface material from flowing through the at least one conduit inlet.

5. The assembly of claim 1, wherein the at least one conduit inlet is provided in a first surface of the thermal exchange plate, and the at least one conduit outlet is provide in a second surface of the thermal exchange plate that is transverse to the first surface.

6. The assembly of claim 1, wherein the at least one conduit inlet is provided in a first surface of the thermal exchange plate, and the at least one conduit outlet is provide in a second surface of the thermal exchange plate that is generally perpendicular to the first surface.

7. The assembly of claim 6, wherein the conduit extends linearly from the at least one conduit inlet to the at least one conduit outlet.

8. The assembly of claim 1, wherein the thermal exchange plate further includes a plurality of coolant channels that are separate and distinct from the conduit.

9. The assembly of claim 1, comprising a thermal interface material within the cavity, and the plurality of battery cell assemblies distributed along an axis, the thermal interface material configured to transfer thermal energy from the plurality of battery cell assemblies to the thermal exchange plate.

10. The assembly of claim 9, wherein the plurality of battery cell assemblies are a first plurality of battery cell assemblies, and comprising a second plurality of battery cell assemblies spaced from the first plurality of battery cell assemblies, the thermal interface material configured to transfer thermal energy from both the first and second plurality of battery cell assemblies to the thermal exchange plate.

11. The assembly of claim 9, wherein the plurality of battery cell assemblies are compressed axially between a pair of end plates.

* * * * *

UNITED STATES PATENT AND TRADEMARK OFFICE
CERTIFICATE OF CORRECTION

| | | |
|---|---|---|
| PATENT NO. | : 10,109,901 B2 | Page 1 of 1 |
| APPLICATION NO. | : 15/216972 | |
| DATED | : October 23, 2018 | |
| INVENTOR(S) | : Rhodes et al. | |

It is certified that error appears in the above-identified patent and that said Letters Patent is hereby corrected as shown below:

In the Claims

In Claim 5, Column 10, Line 15; replace "provide" with --provided--

In Claim 6, Column 10, Line 20; replace "provide" with --provided--

Signed and Sealed this
Fourth Day of January, 2022

Drew Hirshfeld
*Performing the Functions and Duties of the
Under Secretary of Commerce for Intellectual Property and
Director of the United States Patent and Trademark Office*